United States Patent
Hill

(10) Patent No.: US 9,339,086 B2
(45) Date of Patent: May 17, 2016

(54) ADJUSTABLE LOOP LOAD TIE-DOWN STRAP

(71) Applicant: Jerry R. Hill Innovations, Inc., Chassell, MI (US)

(72) Inventor: Jerry R. Hill, Chassell, MI (US)

(73) Assignee: Jerry R. Hill Innovations, Inc., Chassell, MI (US)

( * ) Notice: Subject to any disclaimer, the term of this patent is extended or adjusted under 35 U.S.C. 154(b) by 109 days.

(21) Appl. No.: 13/727,660

(22) Filed: Dec. 27, 2012

(65) Prior Publication Data

US 2014/0182084 A1   Jul. 3, 2014

(51) Int. Cl.
 *A44B 18/00* (2006.01)
 *B65D 63/10* (2006.01)
 *A44B 11/04* (2006.01)
 *B60P 7/08* (2006.01)

(52) U.S. Cl.
 CPC ............. *A44B 11/04* (2013.01); *B60P 7/0823* (2013.01); *B65D 63/1018* (2013.01); *B65D 2313/02* (2013.01); *Y10T 24/3987* (2015.01)

(58) Field of Classification Search
 CPC .... A44B 11/04; B65D 2313/02; B65D 63/10; B60P 7/0823
 USPC ................... 24/115 H, 306, 442, 16 R, 265 H
 See application file for complete search history.

(56) References Cited

U.S. PATENT DOCUMENTS

| | | | | |
|---|---|---|---|---|
| 1,514,962 A * | 11/1924 | Grimaldi | ..................... | 24/579.09 |
| 1,945,932 A * | 2/1934 | Caley | ............................ | 132/247 |
| 3,279,008 A * | 10/1966 | Wallach | ..................... | 24/16 PB |
| 3,365,753 A * | 1/1968 | Prenner et al. | .............. | 24/16 PB |
| 3,855,670 A * | 12/1974 | Brudy | ........................ | 24/16 PB |
| 3,994,048 A * | 11/1976 | Rosenthal | ....................... | 24/306 |
| 4,015,762 A * | 4/1977 | Mendillo | ....................... | 294/149 |
| 4,088,136 A * | 5/1978 | Hasslinger et al. | .......... | 604/179 |
| 4,431,226 A * | 2/1984 | Weilert | ....................... | 294/150 |
| 4,982,522 A * | 1/1991 | Norton | ............................. | 42/85 |
| 5,008,987 A * | 4/1991 | Armour, II | ..................... | 24/442 |
| 5,075,933 A * | 12/1991 | Kemper | ....................... | 24/16 R |
| 5,104,076 A * | 4/1992 | Goodall, Jr. | ............... | 248/205.2 |
| 5,167,050 A * | 12/1992 | Korsen | ......................... | 24/16 R |
| 5,168,603 A * | 12/1992 | Reed | ............................. | 24/16 R |
| 5,177,986 A * | 1/1993 | Jensen | ............................ | 70/18 |

(Continued)

OTHER PUBLICATIONS www.amazon.com/Leopard-Brown-Lanyard-Keychain-Holder/dp/B0054GVAIG/ref: Leopard Brown Lanyard Keychain Holder advertised on Amazon.com : Automotive.

(Continued)

*Primary Examiner* — Victor Batson
*Assistant Examiner* — Jason W San
(74) *Attorney, Agent, or Firm* — James V. Harmon; Nikolai & Mersereau, P.A.

(57) ABSTRACT

Prior load tie-down strap devices containing a Velcro brand hook and loop connector can loosen or peel apart under load. The invention provides an adjustable loop load tie-down strap having a hook and loop (Velcro brand hook and loop connector material) connection within a permanent eye at one end of the strap wherein a standing part of the same strap passes through the eye to form a tie-down loop in the strap that can be adjusted to a larger or smaller size by disconnecting and reconnecting the hook and loop connection within the eye to make the loop the desired size to fit around the article that is to be secured.

8 Claims, 3 Drawing Sheets

(56) References Cited

U.S. PATENT DOCUMENTS

| | | | |
|---|---|---|---|
| 5,745,958 A * | 5/1998 | Kaldor | 24/16 R |
| D401,137 S * | 11/1998 | Boelling | D8/394 |
| 5,882,320 A * | 3/1999 | Peterson | 602/3 |
| 5,943,963 A | 8/1999 | Beals | |
| 5,957,141 A * | 9/1999 | Elkins | 132/273 |
| 6,029,321 A * | 2/2000 | Fisher | 24/306 |
| 6,145,715 A * | 11/2000 | Slonim | 224/148.3 |
| 6,290,440 B1 | 9/2001 | DiViccaro | |
| 6,317,933 B1 * | 11/2001 | Suenaga | 24/16 R |
| 6,394,720 B1 * | 5/2002 | McCay | 410/100 |
| 6,430,784 B1 * | 8/2002 | Dudek et al. | 24/306 |
| 6,447,037 B1 * | 9/2002 | Crouch | 294/149 |
| 6,449,816 B1 * | 9/2002 | Dudek et al. | 24/306 |
| 6,606,768 B2 * | 8/2003 | Henry et al. | 24/306 |
| 6,622,346 B2 * | 9/2003 | Graham et al. | 24/16 R |
| 6,631,539 B1 * | 10/2003 | Chang | 24/599.4 |
| 6,637,079 B1 * | 10/2003 | Goulait et al. | 24/450 |
| 6,701,580 B1 * | 3/2004 | Bandyopadhyay | 24/16 R |
| 6,767,169 B2 * | 7/2004 | Zhan et al. | 410/100 |
| 6,802,109 B2 * | 10/2004 | Hede et al. | 24/318 |
| 7,171,731 B1 | 2/2007 | Borcherding | |
| 7,219,405 B1 * | 5/2007 | Nevens | 24/464 |
| 7,322,780 B2 * | 1/2008 | Hill | 410/97 |
| 7,484,273 B1 * | 2/2009 | Dupree et al. | 24/3.13 |
| 7,587,796 B1 * | 9/2009 | Schultz | 24/306 |
| 7,624,480 B2 * | 12/2009 | Coronel | 24/306 |
| 7,743,735 B2 * | 6/2010 | Weinberg | 119/795 |
| 7,895,716 B2 * | 3/2011 | Taillon et al. | 24/16 R |
| 8,210,405 B1 * | 7/2012 | Pritchard | 224/150 |
| D675,023 S * | 1/2013 | Colgan | D3/327 |
| 8,371,000 B1 * | 2/2013 | Schultz | 24/306 |
| 8,458,864 B1 * | 6/2013 | Patton et al. | 24/306 |
| 8,628,488 B2 * | 1/2014 | Serola | 602/75 |
| 2002/0092138 A1 * | 7/2002 | Spiller | A01K 27/001 24/306 |
| 2005/0081798 A1 * | 4/2005 | Munroe | 119/795 |
| 2006/0032032 A1 * | 2/2006 | Cheng | 24/306 |
| 2006/0143875 A1 * | 7/2006 | Kunold | 24/30.5 R |
| 2007/0086873 A1 | 4/2007 | Rivera | |
| 2008/0235871 A1 | 10/2008 | York | |
| 2009/0241300 A1 * | 10/2009 | Ferguson | 24/300 |
| 2010/0175233 A1 | 7/2010 | Breeden | |
| 2010/0257703 A1 * | 10/2010 | Vass | B60P 7/0823 24/306 |
| 2010/0319167 A1 * | 12/2010 | Nirmel | 24/306 |
| 2012/0023711 A1 * | 2/2012 | Neumann et al. | 24/265 H |
| 2012/0180268 A1 * | 7/2012 | Chen | 24/16 R |

OTHER PUBLICATIONS www.amazon.com/Ancra-40880-10-Red-Original-Down/dp/B000GU20OS/ref: Ancra 408810 Red Original Tie Die advertised on Amazon.com : Automotive.

www.amazon.com/Soft-Loop-Tie-Down-Straps/dp/B002MYLB1Y/ref: (4) Soft Loop Tie-Down Straps advertised on Amazon.com : Sports & Outdoors.

amazon.com/Keeper-Extension-Tie-Down-break-strength/dp/B000CODH0O/ref: Keeper 5729 16" Soft Tie Extension Tie-Down, 800 lbs. WLL (2500 lbs. break strength) 4 pk.—Advertised on amazon.com.

* cited by examiner

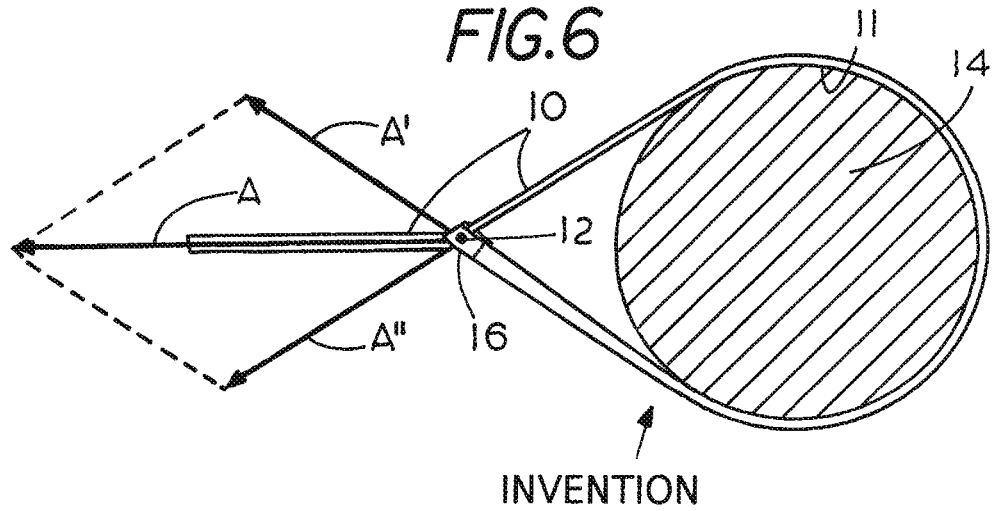
FIG. 6 INVENTION
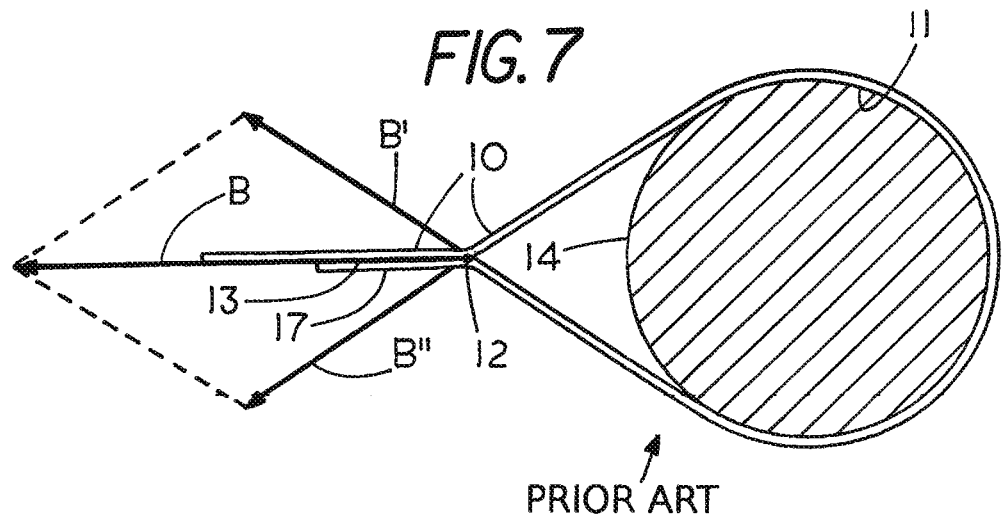
FIG. 7 PRIOR ART

ADJUSTABLE LOOP LOAD TIE-DOWN STRAP

FIELD OF THE INVENTION

This invention relates to the stabilization of articles during shipment or transport as well as to providing a secure connection to an article or for connecting the article to a cord, cable, chain, strap or support structure.

BACKGROUND OF THE INVENTION

While various retainers have been previously proposed, most prior devices are not suited for tying down a wide variety of articles that are to be shipped such as metal tubing, rod or pole stock, boards, or even vehicles such as motorcycles, bicycles, snowmobiles, all-terrain vehicles, and the like. The general objective of the present invention is to provide a retaining device which has wide application for supporting, stabilizing, or tying down articles and can be used both by shipping companies as well as by the consumer for tying down an article, e.g., in the bed of a pick-up truck or trailer that is hauled behind an automobile, SUV, or truck. In commercial use, the invention should be suited for tying down articles that are shipped by truck, train, flatbed, or semi-trailer, etc. Many of the prior connectors used for shipping articles are complicated and hence relatively expensive. To be successful the load tie-down strap should also be strong as well as being adjustable to fit various different size articles. Another requirement is the need to provide a connection that will not slip when adjusted to the right size for fitting the article being shipped.

U.S. Pat. No. 7,171,731, for example, shows strap material having a Velcro brand hook and loop connector surface but the Velcro surface is only suitable for self-organizing the device itself when it is to be stored. Other devices such as U.S. Publication No. 2009/0241300 provide a Velcro brand hook and loop connector connection between two strap sections that are wrapped in a loop passing around a hardware object. However, when the strap is placed under tension the applied force tends to peel the Velcro brand hook and loop connector connection apart presenting an inherent structural weakness.

In view of these and other deficiencies of the prior art, it is one object of the present invention to provide an improved tie-down strap for stabilizing a load that is fully adjustable wherein tension on the strap inherently draws connector elements into tighter and more secure engagement.

Another object is to provide an improved tie-down strap that can be adjusted to form a loop of any selected size which can be cinched down to fit tightly onto various size articles that are to be secured and will remain securely in the position selected without slippage.

Another object of the invention is to provide a strap in which tension on the strap will tend to form a more secure tie-down for the article that is being shipped.

Another object of the invention is to provide a tie-down wrap device suited for wide-scale use which is rugged in construction, reliable in operation, can be produced at a low cost, and includes a provision for retaining the device in a selected position without slippage while wrapped around the article that is being shipped or while connected securely to any other article such as a post, overhead beam, structural member, or other object.

These and other more detailed and specific objects of the present invention will be better understood by reference to the following Figures and detailed description which illustrate by way of example but a few of the various forms of the invention within the scope of the appended claims.

SUMMARY OF THE INVENTION

Prior load tie-down strap devices of the general type with which the invention is concerned have been either difficult to adjust, require metal buckles for adjustment or when Velcro brand hook and loop connector is used the Velcro may tend to peel apart under load so that although the Velcro connection may hold initially, if placed under enough stress the Velcro may begin to peel apart as the hooks start to pull out of the loops that are used to hold them. To overcome these and other deficiencies, the invention provides an adjustable loop load tie-down strap having a hook and loop connection within an eye at the end of the strap and a standing section of the same strap is passed through the eye for forming a tie-down loop in the strap adjacent to the eye that can be adjusted to a larger or smaller size by disconnecting and reconnecting a hook and loop connection within the eye to better fit the loop around the object that is to be secured.

BRIEF DESCRIPTION OF THE DRAWINGS

FIG. 6 is a force diagram showing how forces are applied in a strap structured according to the invention.
FIG. 7 is a force diagram similar to FIG. 6 showing how forces are applied in a strap structured according to the prior art.

DESCRIPTION OF THE PREFERRED EMBODIMENTS

Figure 1:
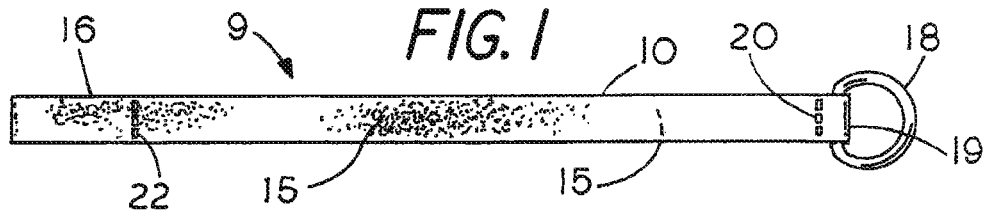
FIG. 1 is a top view of one form of the invention.
Figure 2:
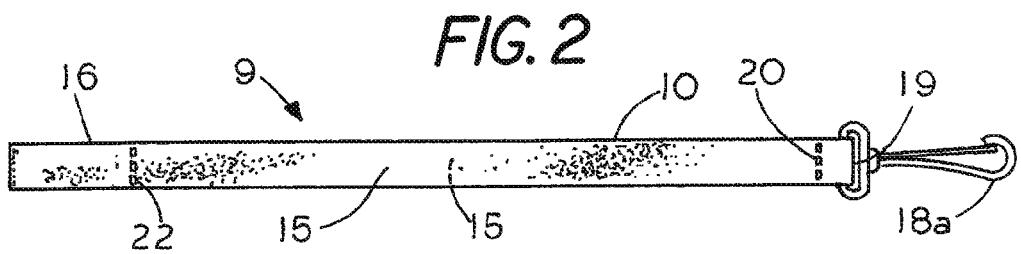
FIG. 2 is a bottom view similar to FIG. 1 with a snap hook at its right end rather than a D-ring.
Figure 3:
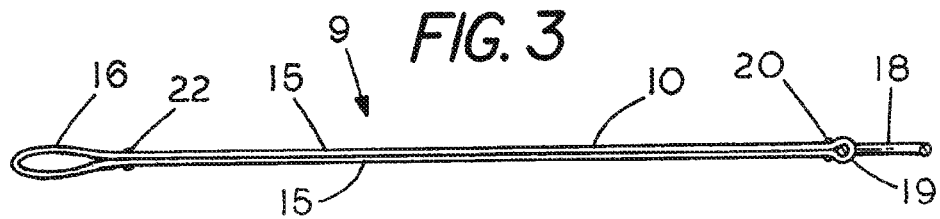
FIG. 3 is a side view of the invention of FIG. 1.

Refer to the figures and especially FIGS. 1-4. FIG. 1 shows a top view, FIG. 2 a bottom view and FIG. 3 a side view of strap 9 in accordance with the invention having a standing part 10 with a connector such as a D-ring 18 (FIGS. 1 and 3) secured to it at one end or a snap hook 18a (FIG. 2) or any other suitable connector formed from strong plastic or metal. The strap is preferably formed from a strong woven material or webbing such as a natural or synthetic fiber with high tensile warp fibers running the length of the strap and having a Velcro brand hook and loop connector coupling material such loops 15 on at least the upper surface and a complementary material, e.g., hooks covering at least a part of the interior of an eye 16 at the opposite end from the D-ring. The eye 16 is a permanent loop formed from the end portion of the strap material in which its tip is stitched or otherwise secured to itself at 22. The inner surface of the eye 16 is formed from hooks 16a of the usual construction found in a Velcro brand hook and loop connector product as best seen in FIG. 4A. One convenient way to assemble the strap is to provide a single piece of Velcro brand hook and loop connector in which the upper surface and lower surface both comprising loop material 15 exposed on the top and bottom surface. The strap can be made by folding Velcro brand hook and loop connector material back upon itself at a transverse opening 19 around the D-ring 18 or other connector and stitching it together at 20 (FIGS. 1, 3 and 4) e.g., around the base of the D-ring or snap hook (FIG. 2). Upper and lower sections of the strap material can be stitched together along its length in superimposed parallel face to face engagement and transversely at its left end FIGS. 1-3 as shown at 22 to form the permanent eye 16 covered on its entire inner surface with the hook fasteners 16a (FIG. 4A). If desired the loops 15 and hooks 16a can be reversed.

Figure 4:
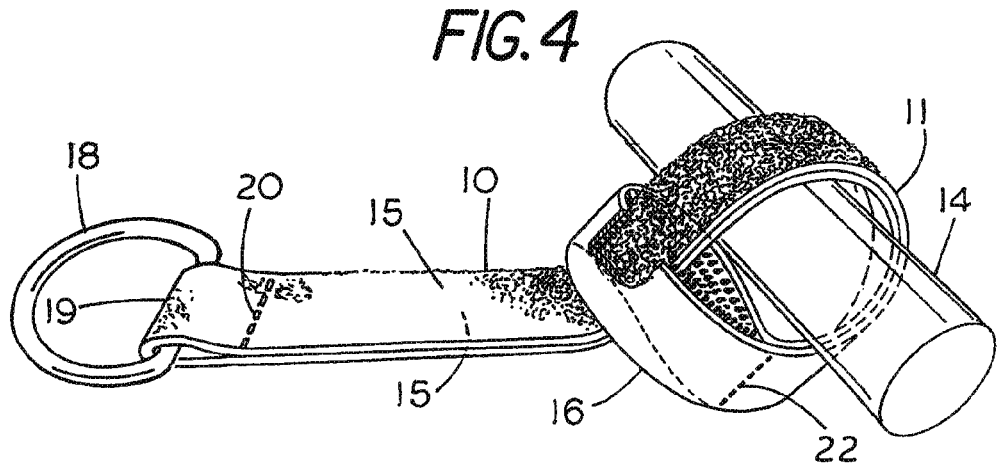
FIG. 4 is a perspective view showing a strap according to the invention while connected to an object that is to be secured.
Figure 4A:
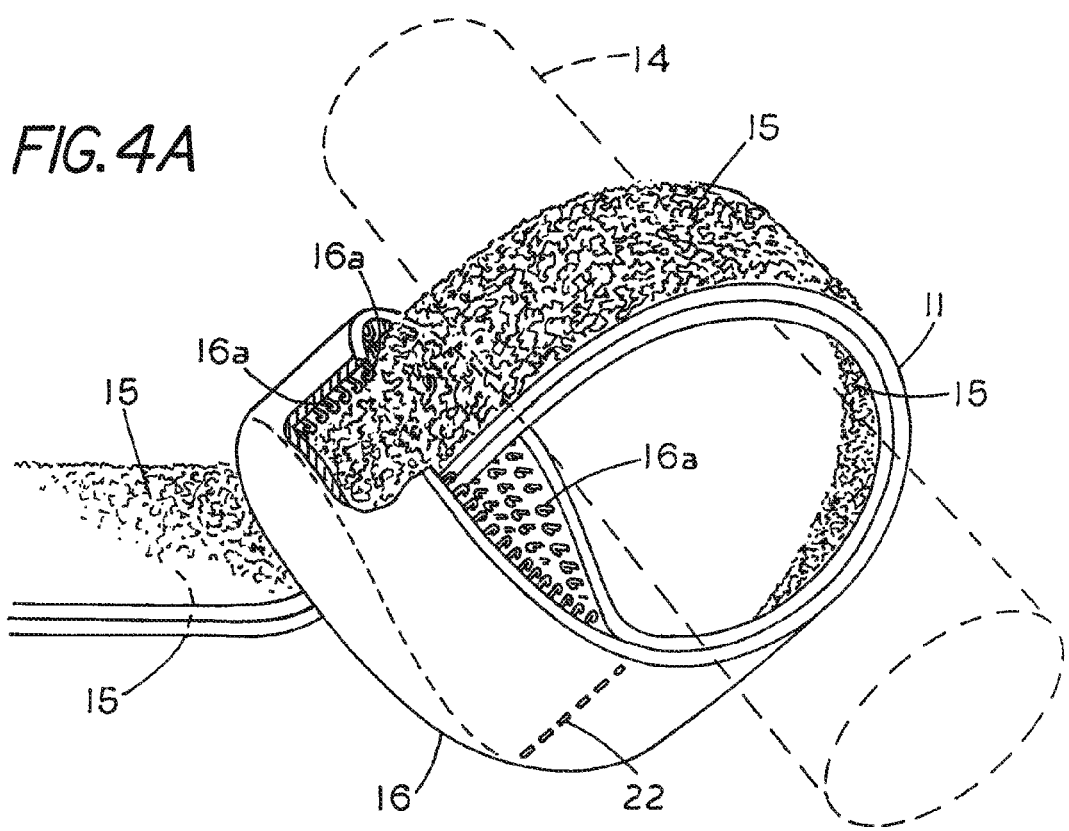
FIG. 4A is a greatly enlarged view of the looped portion of the invention shown in FIG. 4 encircling the object that is to be secured.

When placed in use, the strap 9 thus constructed is formed into an adjustable loop 11 around an article such as a bar 14 only a portion of which is shown as shown in FIGS. 4 and 4A by passing the D-ring or other connector through the eye 16. Then by opening the opposed portion of the eye with ones fingers, the eye can be slipped toward the right as seen on the figures on the standing part 10 of the strap 9 as close as desired to the article 14 so as to be securely or held by the strap. It will be seen that no matter how the strap is oriented, if the loop connectors 15 are provided as shown on both upper and lower surfaces of the strap, the loops 15 will be pressed into contact with the hooks 16a as tension is applied to the end of the strap by the D-ring 18 or other connector. The tension thus applied has a tendency to force the hooks 16a toward the loops 15 thus pressing the hook and loop components into engagement with one another to thereby achieve a strong secure connection. The connection thus achieved by the present invention can be better understood and compared with the prior art by reference to FIGS. 6 and 7 as will be described below.

In another embodiment, the inside surface of the eye 16 is provided with the loop material of a hook and loop connector and the upper and lower surfaces of the standing part of the strap 9 comprises the hook component of a hook and loop fastening system.

Refer now to FIGS. 6 and 7 which show similar force diagrams for the invention (FIG. 6) and the prior art (FIG. 7) in the case of two straps 9 each having a loop 11 around an article 14 to be secured and each coupled to itself at a connecting point 12. The invention has a ring or eye 16 through which the standing part 10 of the strap passes. It will be seen that the prior art has a face-to-face hook and loop connection 13 between the standing part 10 and a terminal end portion 17. In each figure, equal tension forces A and B, for example 100 lbs. is exerted on the standing part of the strap. This 100 lb. force can be resolved into two components consisting of forces A' and A" (FIG. 6) on the axis of each strap segment of the invention between the connecting point 12 and the article 14 using the parallelogram method showing that the length of each of the component forces is in this case about 54 lbs. FIG. 7 illustrating the prior art shows that the same 100 lb. force B is divided into two components B' and B" aligned with the strap segments that are of the same length as in FIG. 6 namely, about 54 lbs. each. In the case of the invention, the diverging forces A' and A" drive the hook and loop surfaces toward one another causing them to become more tightly engaged as more tension is applied. However in the case of the prior art (FIG. 7) equal forces B' and B" tend to pull apart the hook and loop connection between the free standing section and the terminal end 13 of the strap which can cause a sudden drastic failure by peeling them apart. As a result a tie-down strap structured as in the invention is several times stronger than the prior art of FIG. 7 exemplified, in U.S. Pat. No. 5,943,963 and U.S. Publication No. 2009/0241300A1. The reason for the greater strength of the invention is due to component forces of the stress applied along the axis of a strap tending to pull prior art hook and loop connections apart while the same forces when applied to the invention make the hook and loop connection of the invention more secure.

Figure 5:
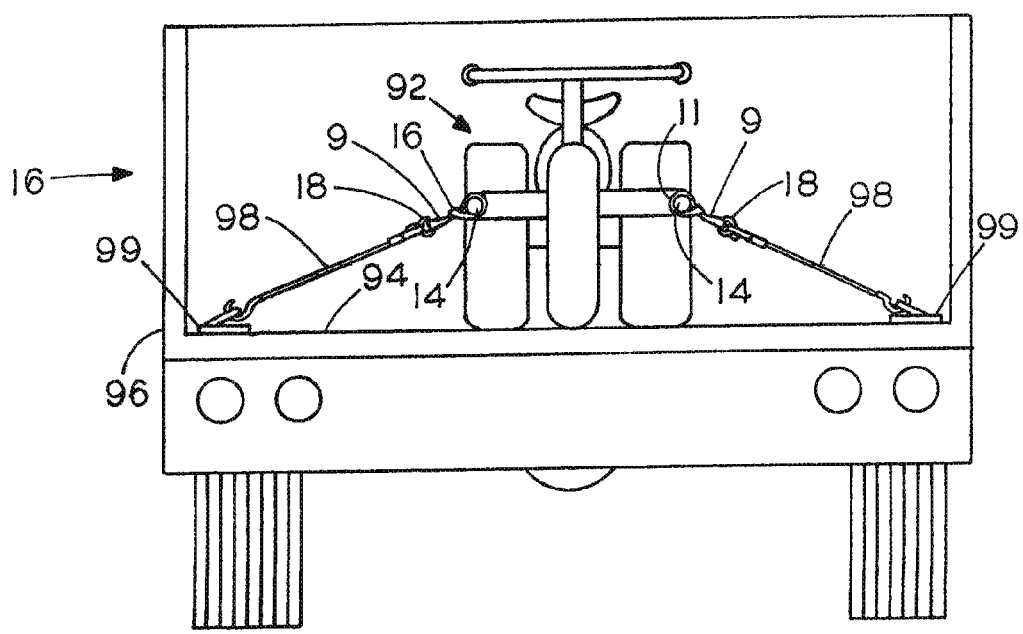
FIG. 5 is a view showing how the invention can be used to secure an article as it is being transported during shipment.

Refer now to FIG. 5 which illustrates the invention in use for securing an article, in this case an all-terrain vehicle 92 to the bed 94 of a truck 96 or other vehicle. The adjustable loop load tie-down strap 9 as shown in FIGS. 1-4 is placed around two of the frame elements 14 of the vehicle 92 and held in place by bungee cores 98 on each side of the load at 92. Lower ends of the bungee cords 98 are secured to the floor of the vehicle by fasteners at 99 of any commercially available kind so as to exert tension on the adjustable loop load tie-down straps 9 thereby holding the load 92 securely in place during transport. The invention has many other applications, for example, to connect articles to the luggage rack on top of a vehicle. The loop 11 that is formed around the article 14 can be easily adjusted into any size by spreading apart the eye 16, for example, by pressing on its upper and lower ends and pulling the sides apart and then sliding it in either direction on the standing part 10 to the desired point and then allowing the hooks 16a to become engaged with the loops 15. The invention can be easily made from relatively low cost strap material, is readily fabricated and can be therefore be efficiently produced on a mass scale. It is adjustable and will not slip or tend to separate even when a heavy load places a substantial tension on the strap. In fact, as the tension is increased, the hook and loop components will be forced more tightly into engagement with one another thereby strengthening the connection. The invention will also stay in place, i.e., remain attached after tension is released and this way the loop 11 stays tightly engaged on an article and will not loosen or become disconnected.

In addition to stabilizing articles that are being shipped, the invention can be used whenever a rope or cable, etc., is to be connected to an object, e.g. for connecting a cable to a tree or to an overhead beam in a building. Many other uses will be apparent from the present disclosure.

Many other variations of the present invention within the scope of the appended claims will be apparent to those skilled in the art once the principles described herein are understood.

The invention claimed is:

1. An adjustable loop tie-down strap for holding articles during shipment comprising, a) a piece of elongated strap material, b) an eye in the piece of strap material of sufficient size for the strap material to be passed therethrough and being formed by the strap material being folded transversely and permanently secured to a portion of the strap material itself by a permanent fastening comprising stitching or a like fastening that is constructed to resist being manually pulled apart in the manner of a hook and loop connection, c) the fastening being proximate an end of the eye such that the eye thereby comprises a permanently closed non-releasable loop structure, d) the tie-down strap has an integral elongated standing part of sufficient length to be passed through the eye and extending away from the eye as a means of securing the tie-down strap to an object that is spaced apart from the eye, e) the standing part having an exposed surface of a first hook and loop material, f) the eye has an interior surface of a second hook and loop material for being attached to the standing part of the strap by a hook and loop connection inside the eye to enable the eye to be pulled apart manually and slid in either direction on the standing part and, g) whereby the standing part of the strap when passed through the eye thereby forms an adjustable loop around an article with the first and second hook and loop materials being in engagement with one another to form a hook and loop connection therebetween that is located within the eye such that tension applied during use to the elongated standing part of the strap forces the first and second hook and loop materials toward one another within the eye so as to be in more secure engagement with one another as the tension on the standing part of the strap is increased.

2. The tie-down strap of claim 1 wherein a connector is secured to a free end of the elongated standing part of a strap for fastening the strap to an article or to a support structure.

3. The tie-down strap of claim 2 wherein the connector is a D-ring or a snap hook.

4. The tie-down strap of claim 1 wherein the strap has a relatively small transverse opening at one end through which a connector member extends and the eye comprises a relatively larger permanent loop at the opposite end of the strap that is of sufficient interior dimensions for enabling the connector to pass therethrough to form the adjustable loop around the article.

5. The strap of claim 4 wherein the connector member comprises a D-ring, a hook or a snap hook and the strap comprises two layers of strap material in parallel superimposed aligned face to face engagement that are secured to one another by stitching or the like.

6. An adjustable loop tie-down strap for holding articles during shipment comprising,
   a) a piece of elongated strap material,
   b) an eye in the piece of strap material of sufficient size for the strap material to be passed therethrough and being formed by the strap material being folded transversely and permanently secured to a portion of the strap material by a permanent fastening comprising stitching or a like fastening that is constructed to resist being manually pulled apart in the manner of a hook and loop connection,
   c) the fastening being proximate an end of the eye such that the eye thereby comprises a permanently closed non-releasable loop structure,
   d) the tie-down strap has an integral elongated standing part that extends away from the eye as a means of securing the tie-down strap to an object that is spaced apart from the eye,
   e) the standing part of the strap having at least one of an upper or lower surface thereof formed of a first hook and loop material,
   f) the eye has an interior surface of a second hook and loop material for being attached to the standing part of the strap by a hook and loop connection inside the eye to enable the eye to be pulled apart manually from the standing part and slid in either direction on the standing part,
   g) wherein the tie-down strap has an intermediate portion formed from two layers of the strap material in superimposed parallel face to face lengthwise engagement that are secured to one another by a permanent connection formed from stitching or like construction that cannot be manually pulled apart in the manner of a hook and loop connector and the eye is located at one end of the intermediate portion thereof and
   h) the tie-down strap has a coupling member selected from a ring or a hook connected to the tie-down strap at an opposite end of the intermediate portion from the eye.

7. The tie-down strap of claim 1 wherein the standing part of the strap is looped around the article during use and passed through the eye for being secured to the object.

8. The tie-down strap of claim 6 wherein the standing part of the strap is looped around the article during use and passed through the eye.

* * * * *